Figure 1:
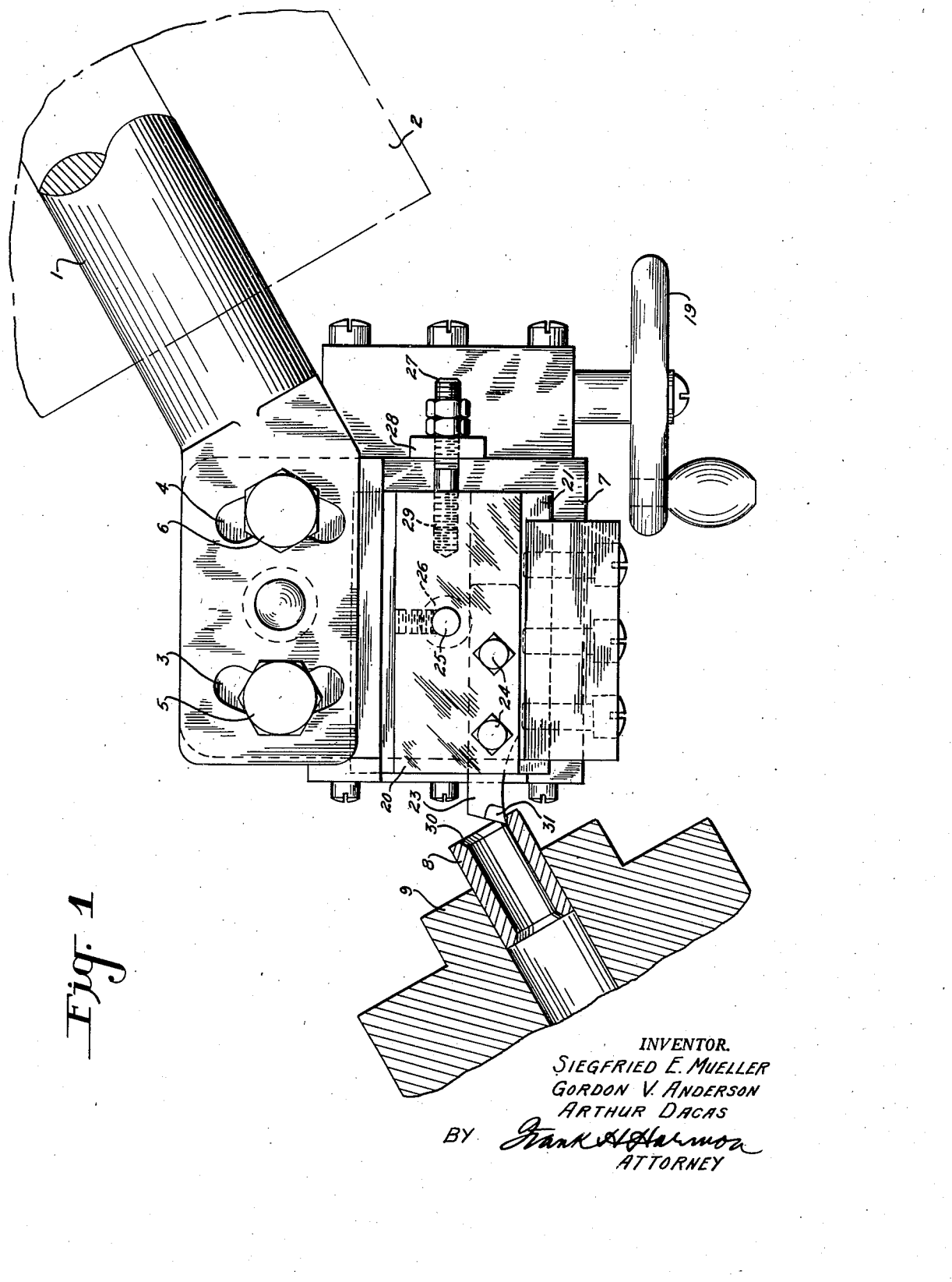

Dec. 14, 1948.　　　S. E. MUELLER ET AL　　　2,456,140
ADJUSTABLE CHAMFERING DEVICE
Filed Jan. 17, 1944　　　　　　　　　　2 Sheets-Sheet 1

INVENTOR.
SIEGFRIED E. MUELLER
GORDON V. ANDERSON
ARTHUR DACAS
BY
ATTORNEY

Dec. 14, 1948.  S. E. MUELLER ET AL  2,456,140
ADJUSTABLE CHAMFERING DEVICE
Filed Jan. 17, 1944  2 Sheets-Sheet 2

INVENTOR.
SIEGFRIED E. MUELLER
GORDON V. ANDERSON
ARTHUR DACAS
BY
ATTORNEY

Patented Dec. 14, 1948

2,456,140

UNITED STATES PATENT OFFICE 2,456,140

ADJUSTABLE CHAMFERING DEVICE

Siegfried E. Mueller, East Cleveland, Gordon Victor Anderson, Shaker Heights, and Arthur Dacas, Cleveland, Ohio, assignors, by mesne assignments, to Jack & Heintz Precision Industries, Inc., Cleveland, Ohio, a corporation of Delaware Application January 17, 1944, Serial No. 518,564

2 Claims. (Cl. 29—57)

1

This invention relates in general to metal working machines and more particularly to improvements in tool slide mechanisms adapted for use in various types of machines such as turret lathes and the like.

With the conventional design of tool slide mechanism having a tapering slide with gear and rack feed much difficulty has been encountered in machining perfect concentric and smooth centers or angular surfaces which is necessary for succeeding operations including finish grinding for high precision work. This, as well as the process employing a center drill or form tool, produces centers or angular surfaces that are eccentric and full of chatter marks as well as centers that can not be held close enough to the proper angle. Even extra lapping operations would not remedy eccentricity and many rejections of finished parts, being out of round, result.

It is therefore one of the primary objects of the present invention to provide an improved mechanism whereby a tool holder may be fed relatively to the work in different adjusted paths so that the tool can be operated for cutting the work at various angles by adjusting the path of movement of the tool holder.

Another object of primary importance is to provide an improved angular slide operating mechanism for a single point tool holder that will eliminate back lash and chattering and insure smooth, even, fine and positive feed in order to obtain perfect concentric and smooth centers, chamfers or angular surfaces.

To this end it is proposed to use a single point tool set at the proper adjusted angle and advanced into the work at an even fine feed. Accordingly, the adjustable slide is provided with a tool feeding mechanism of simple and efficient construction including an irreversible worm gear drive in conjunction with a barrel cam of desired cam lead to drive a cam engaging roller carrying the tool carrying adjustable angle slide. In this manner back lash is eliminated and smooth and concentric chamfers are obtained and eccentricity and chatter marks are eliminated.

With the foregoing and other objects in view, the invention resides in the combination of parts and in the details of construction hereinafter set forth in the following specification and appended claims, certain embodiments thereof being illustrated in the accompanying drawings, in which:

Figure 1 is a plan view of a part of the assembly including the turret, the slide and the chamfering tool as applied to the work;

2

Figure 2:
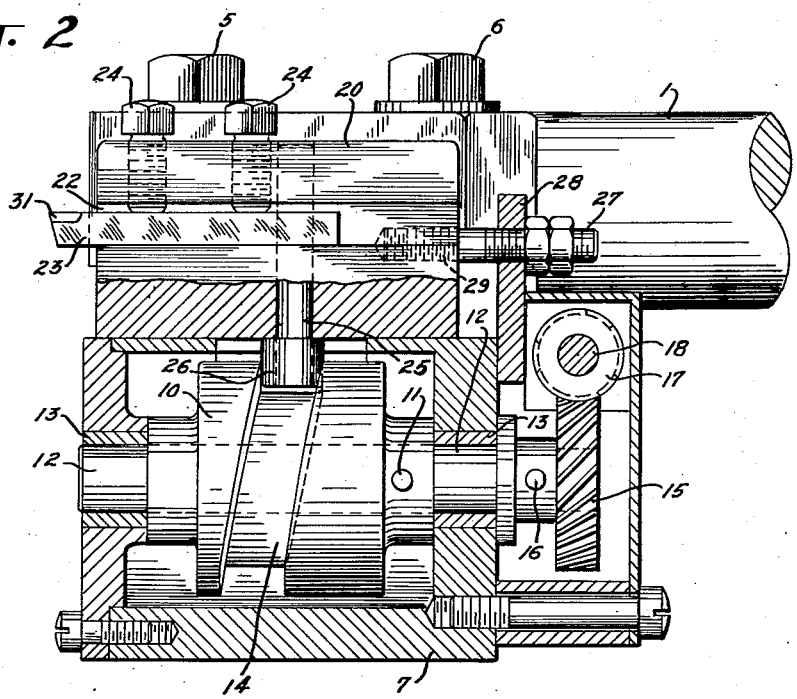
Figure 3:
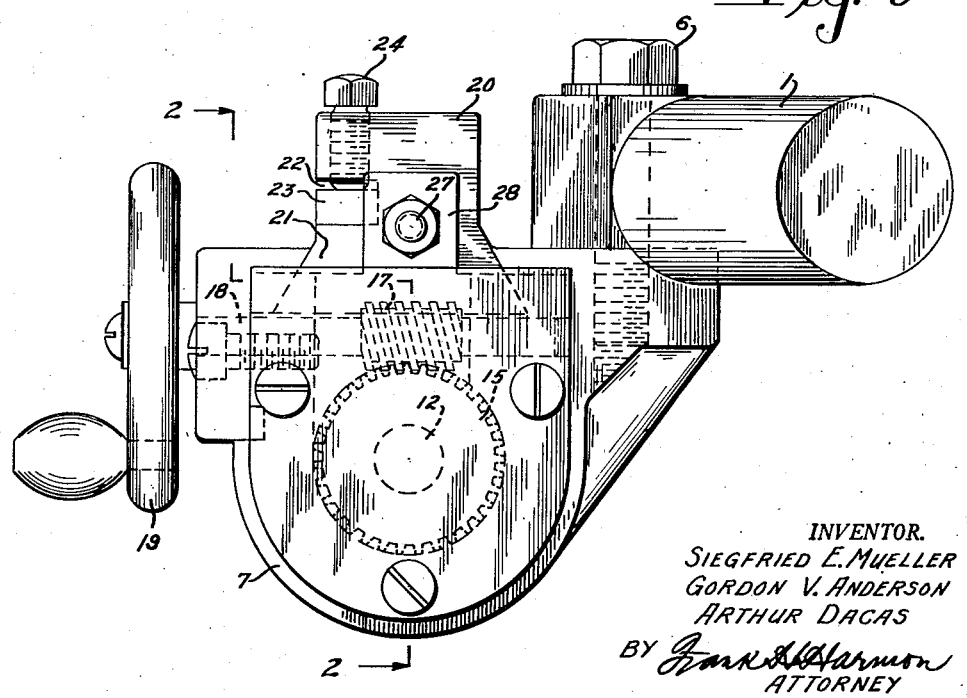

Figure 2 is a view in cross section taken through the tool slide and the barrel cam operating means therefor; and Figure 3 is an end view of the assembly of Figure 1.

Before explaining in detail the present improvement and mode of operation, the present construction generally comprises an adjustable angular tool slide on which is mounted a single point tool. The slide carries a roller which engages a spiral cam slot of desired lead in a barrel cam. The barrel cam is rotated through a worm wheel drive. With the tool slide adjusted to the proper angle, a turning of the hand wheel, through the worm wheel drive, rotates the barrel cam and the roller carried by the tool slide and engaging the spiral slot of predetermined lead in the barrel predeterminedly adjusts the single point cutter into and out of engagement with the work.

In the drawings wherein a present preferred embodiment of the invention is illustrated there is shown the cylindrical shank 1 of a tool holder carried by a chuck of a turret 2. Shank 1 has a flat portion which is provided with two opposed arcuate slots 3 and 4 to receive adjusting bolts 5 and 6. In this manner the angularity between the cutting tool and the work may be predeterminedly set.

The work is shown at 8 carried by a suitable work spindle 9 and the operation involved is chamfering in much the same manner as disclosed in United States Letters Patent to Drissner, No. 1,604,114, dated October 26, 1926, with certain exceptions, more notably in regard to the mechanism for advancing and retracting the tool toward and away from the work. In short, this Drissner type of gear and rack feed is adaptable only for large diameter work and not for precision centerng due to coarse feed and back lash present in the gear and rack feed. Accordingly, the present invention involves the use of a barrel cam 10 secured by a pin 11 to a rotatable shaft 12 mounted in bearings 13 in a housing 7. This barrel cam is provided with a peripheral arcuate slot 14 of predetermined lead. The cam is rotated by means of an irreversible high pitch worm gear drive including gear 15 pinned at 16 to shaft 12 and meshing with worm 17 carried by shaft 18, to which a hand wheel 19 is connected for manual rotation of the cam.

The cam housing 7 is provided with a dovetail slideway to receive the outwardly flared portion 21 of a tool slide 20. The tool slide has a key way 22 to receive the chamfering tool 23 and the tool is held in adjusted position by screw bolts 24. The tool slide has secured thereto a stationary shaft 25 which carries a roller 26 of proper size to engage the arcuate cam slot of the barrel cam. Thus, as the hand wheel 19 is turned in a clockwise direction and the barrel cam thereby rotated, the engagement of roller 26 with the cam causes the tool slide to be advanced toward the work 8. The forward limit of movement may be determined by the nature of the cam slot and the return limit determined by an adjustable screw bolt 27 secured to an extension 28 of the housing 7 and extending into an opening 29 of predetermined depth in the tool slide.

Figure 1 shows the tool and tool slide assembly in full forwardly advanced position and the single point tool 31 engaged with the work 8, in the form of a small diameter hollow cylindrical member and performing an inside chamfering operation to produce the chamfer 30.

From the foregoing it will be seen that there has been provided a tool slide feed mechanism that eliminates the use of the usual gear and rack and avoids the attending back lash and chatter. The simplicity of design and the positive high pitch worm gear drive of the barrel cam of desired lead per revolution for driving the angular tool slide makes for positive and precision relationship between the single point tool and the work for chamfering purposes.

We claim:

1. An attachment comprising a tool holder having a shank for mounting in an indexible tool turret, a cam carried by said tool holder, a tool slide and tool support slidably carried by said cam housing, manual means for slidably advancing and returning said tool slide and tool in said cam housing toward and away from said work, said means comprising a barrel cam including a barrel with a spiral cam slot therein and rotatably mounted in said cam housing, a roller carried by said tool slide and engaging said cam slot to operatively connect said cam to said tool slide, a hand wheel and an irreversible worm gear drive between the same and said cam for manually rotating said cam in either direction and adjustment stop limiting members carried by said adjusting plate for limiting relative sliding movement of said tool slide in said cam housing.

2. An attachment comprising a tool holder having a shank for mounting in an indexible tool turret, a cam carried by said tool holder, a tool slide and tool support slidably carried by said cam housing, manual means for slidably advancing and returning said tool slide and tool in said cam housing toward and away from said work, said means comprising a member provided with a spiral cam slot rotatably mounted in said cam housing, a stud carried by said tool slide and engaging said cam slot to operatively connect said cam to said tool slide and a manual control member and gear drive between said manual control member and said cam for manually rotating said cam in either direction and adjustable means for limiting the relative sliding movement of said tool slide in said cam housing.

SIEGFRIED E. MUELLER.
GORDON VICTOR ANDERSON.
ARTHUR DACAS.

REFERENCES CITED

The following references are of record in the file of this patent:

UNITED STATES PATENTS

| Number | Name | Date |
|---|---|---|
| 494,737 | Dost | Apr. 4, 1893 |
| 693,346 | Bedworth et al. | Feb. 11, 1902 |
| 738,854 | Smith | Sept. 15, 1903 |
| 831,974 | Muller | Sept. 25, 1906 |
| 1,000,011 | Johnson et al. | Aug. 8, 1911 |
| 1,289,674 | Coradi | Dec. 31, 1918 |
| 1,604,114 | Drissner | Oct. 26, 1926 |
| 1,678,924 | Strindenberg | July 31, 1928 |
| 2,257,503 | Lange | Sept. 30, 1941 |